United States Patent
Lee et al.

(10) Patent No.: US 11,390,526 B2
(45) Date of Patent: Jul. 19, 2022

(54) METHOD FOR STABILIZATION OF CARBON NANOTUBES INCLUDING CATALYST METAL PARTICLES

(71) Applicant: KOREA INSTITUTE OF SCIENCE AND TECHNOLOGY, Seoul (KR)

(72) Inventors: Jae Kap Lee, Seoul (KR); Kwang Koo Jee, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 16 days.

(21) Appl. No.: 16/936,130

(22) Filed: Jul. 22, 2020

(65) Prior Publication Data

US 2022/0024769 A1  Jan. 27, 2022

(30) Foreign Application Priority Data

Jul. 21, 2020 (KR) .................. 10-2020-0090295

(51) Int. Cl.
  *C01B 32/168* (2017.01)
  *B82Y 40/00* (2011.01)
  *B82Y 30/00* (2011.01)

(52) U.S. Cl.
  CPC ............. *C01B 32/168* (2017.08); *B82Y 30/00* (2013.01); *B82Y 40/00* (2013.01)

(58) Field of Classification Search
  CPC ... C01B 32/168; C01B 32/158; C01B 32/159; C01B 32/16; C01B 32/162; C01B 32/164; C01B 32/166; C01B 32/17; C01B 32/172; C01B 32/174; C01B 32/176; C01B 32/178; C01B 2202/00; C01B 2202/02; C01B 2202/04; C01B 2202/06; C01B 2202/08; C01B 2202/10; C01B 2202/20; C01B 2202/22; C01B 2202/24; C01B 2202/26; C01B 2202/28; C01B 2202/30;
(Continued)

(56) References Cited

U.S. PATENT DOCUMENTS

2010/0008843 A1* 1/2010 Hauge ................... B82Y 30/00
                                                           423/447.1

FOREIGN PATENT DOCUMENTS

JP      2005306681 A    11/2005
KR  10-2008-0021334 A    3/2008

OTHER PUBLICATIONS

Hu, et al., Nitric Acid Purification of Single-Walled Carbon Nanotubes, J. PHys. Chem. B. 2003; 107: 13838-13842 (Year: 2003).*
(Continued)

*Primary Examiner* — Daniel C. McCracken
(74) *Attorney, Agent, or Firm* — Rabin & Berdo, P.C.

(57) ABSTRACT

A method of safely stabilizing carbon nanotubes containing reactive or unstable catalyst metal particles by selective oxidation, or melting and removing the catalyst metal particles under controlled conditions. In one embodiment, the method may include preparing carbon nanotubes containing a residual catalyst metal, pickling the carbon nanotubes, and the subsequence oxidation of the residual catalyst metal by heat-treating without oxidation of the carbon nanotubes. In another embodiment, the method may include preparing carbon nanotubes containing a residual catalyst metal, first acid pickling, melting the residual catalyst metal by heat-treating in a vacuum chamber, and second acid pickling to remove the melted residual catalyst metal.

15 Claims, 3 Drawing Sheets

(58) Field of Classification Search
CPC ............ C01B 2202/32; C01B 2202/34; C01B 2202/36; B82Y 30/00; B82Y 40/00; D01F 9/12; D01F 9/127; D01F 9/1271; D01F 9/1272; D01F 9/1273; D01F 9/1274; D01F 9/1275; D01F 9/1276; D01F 9/1277; D01F 9/1278; D01F 9/133
See application file for complete search history.

(56) References Cited

OTHER PUBLICATIONS

Andrews, et al., Purification and structural annealing of multiwalled carbon nanotubes at graphitization temperatures, Carbon 2001; 39: 1681-1687 (Year: 2001).*

"Melting Point of Metals," accessed online at: https://www.onlinemetals.com/en/melting-points on Oct. 8, 2021 (Year: 2021).*

Huang, et al., 99.9% purity multi-walled carbon nanotubes by vacuum high-temperature annealing, Carbon 2003; 41: 2585-2590 (Year: 2003).*

Martin Pumera, "Carbon Nanotubes Contain Residual Metal Catalyst Nanoparticles even after Washing with Nitric Acid at Elevated Temperature Because These Metal Nanoparticles Are Sheathed by Several Graphene Sheets", Langmuir, vol. 23, No. 11, pp. 6453-6458, Apr. 25, 2007.

* cited by examiner

METHOD FOR STABILIZATION OF CARBON NANOTUBES INCLUDING CATALYST METAL PARTICLES

CROSS-REFERENCE TO RELATED APPLICATION

This application claims the benefit of Korean Patent Application No. 10-2020-0090295, filed on Jul. 21, 2020, in the Korean Intellectual Property Office, the disclosure of which is incorporated herein in its entirety by reference.

BACKGROUND

1. Field

The present invention relates to a method of safely tuning carbon nanotubes containing nano-sized catalyst metal particles inside, and more particularly, to a method of stabilizing carbon nanotubes by performing a process of oxidization or melting removal of the catalyst particles remaining inside even after the purification (acid treatment).

2. Description of the Related Art

Carbon nanotube is an ideal chemical material due to its chemical stability and good conductivity of $10^6$ to $10^7$ $Sm^{-1}$ equivalent to that of copper (about 10 times and 10,000 times as those of graphite and carbon black, respectively). Carbon nanotubes are classified into single-wall carbon nanotubes (SWNTs) and multi-wall carbon nanotubes (MWNTs). MWNTs, which are available by mass production, are generally used as conductive additives in the fields of energy such as Li-ion batteries (LIB) and fuel cells.

Recently, it has been reported that battery performance is significantly enhanced by using carbon nanotubes as conductive additives of LIBs for notebook computers. This shows that the use of carbon nanotubes as conductive additives in mid- to large-sized LIBs for electric vehicles (EVs) and energy storage systems (ESSs) may enhance battery performance.

Among techniques for manufacturing carbon nanotubes, catalyst chemical vapor deposition (CCVD) synthesis is known as the best method for mass production of CNTs. CNTs are synthesized in a reaction furnace where metal catalysts are sprayed with hydrocarbon gas. The metal catalysts are transition metal such as iron (Fe), cobalt (Co), nickel (Ni), aluminum (Al), and the like.

According to the gas phase synthesis, the catalyst metal is vaporized using heat in the reaction furnace, and the vaporized catalyst metal is decomposed to produce catalyst metal atoms. The catalyst metal atoms in nanoparticles gather to form nano-sized clusters, serving as nuclei for formation of carbon nanotubes. That is, metal nanoparticles absorb carbon atoms from the hydrocarbon gas and nucleate CNTs on their surface. Some catalyst nanoparticles can be trapped inside the carbon nanotubes during their CCVD growth. Such trapped nanoparticles remain inside CNTs even after purification to remove the nanoparticles with an acid treatment is done, since acid (liquid) cannot reach to the isolated nanoparticles inside of the CNTs. The trapped nanoparticles inside CNTs is due to their helical growth: a SWNT is resulted from the growth of a graphene ribbon into a spiral structure and a MWNT is a 'spiral graphite', looking like a tube, resulted from the helical growth of graphite nanoribbons.

FIG. 4 shows a transmission electron microscope (TEM) image revealing a MWNT (Langmuir 2007, 23, 6453-6458). Two catalyst metal particles (having a size of about 10 nm) appear as trapped in the inner space of the MWNT (white arrow).

When carbon nanotubes including the catalyst metal as described above are used as an active material or conductive additives in LIBs, 1) structural changes of carbon nanotubes (due to spiral structure) according to a long time cycle of charge and discharge, 2) formation of gaps of ~1 nm in width between helical edges of carbon nanotubes making the metal expose to electrolyte, 3) chemical (exothermal) reaction resulting in a thermal runaway of LIB, 4) breakdown of LIB separator, and 5) explosion of LIB may sequentially occur. Such fatigue explosion may occur more easily in the mid- to large-sized LIBs for EV/ESS working under more severe charging and discharging conditions than that of small-sized batteries for electronic devices.

SUMMARY

The present invention has been proposed to solve various problems including the above problems, and an object of the present invention is to provide a method of stabilizing carbon nanotubes by oxidizing unstable catalyst metal particles included in the carbon nanotubes or by removing the catalyst metal particles by melting.

However, problems to be solved are illustrative and the scope of the present invention is not limited thereby.

Additional aspects will be set forth in part in the description which follows and, in part, will be apparent from the description, or may be learned by practice of the presented embodiments.

According to an aspect of the present invention to achieve the object, provided is a method of stabilizing carbon nanotubes.

The method includes: preparing carbon nanotubes containing a catalyst metal; and oxidizing the catalyst metal by heat-treating the carbon nanotubes.

Also, according to an embodiment of the present invention, the heat-treating may be performed in an atmosphere in which the catalyst metal is selectively oxidized without oxidizing the carbon nanotubes.

Also, according to an embodiment of the present invention, the heat-treating may be performed in a temperature range of 100° C. to 500° C.

Also, according to an embodiment of the present invention, the heat-treating may be performed either under atmospheric conditions or in an oxygen atmosphere.

Also, according to an embodiment of the present invention, the heat-treating may be performed after continuously raising temperature to an oxidation heat treatment temperature.

Also, according to an embodiment of the present invention, the heat-treating may include a process of raising temperature by steps to an oxidation heat treatment temperature.

Also, according to an embodiment of the present invention, a heating rate may be in a range of 3° C./min to 10° C./min while raising the temperature.

Also, according to an embodiment of the present invention, the heat-treating includes: a first heat treatment process for oxidation heat treatment performed in a temperature range of 25° C. to 300° C.; a temperature-raising process after the first heat treatment process; and a second heat treatment process performed for oxidation heat treatment in a temperature range of 300° C. to 500° C.

Also, according to an embodiment of the present invention, the method may further include acid pickling the carbon nanotubes before the heat-treating.

Also, according to an embodiment of the present invention, the catalyst metal may include one selected from iron (Fe), nickel (Ni), cobalt (Co), and aluminum (Al).

According to another aspect of the present invention, provided are stabilized carbon nanotubes including particles of an oxide of a catalyst metal in inner spaces thereof.

Also, according to an embodiment of the present invention, the particles of the oxide of the catalyst metal may include an oxide of one selected from iron, nickel, cobalt, and aluminum.

According to another aspect of the present invention to achieve the object, provided is a method of stabilizing carbon nanotubes by melting and acid treatment.

The method includes: preparing carbon nanotubes including a catalyst metal; melting the catalyst metal by heat-treating the carbon nanotubes; and acid treatment process to remove the melted catalyst metal.

Also, according to an embodiment of the present invention, the acid treatment may be performed to remove the metal eluted from the carbon nanotubes.

Also, according to an embodiment of the present invention, the catalyst metal may include one selected from iron (Fe), nickel (Ni), cobalt (Co), aluminum (Al), and molybdenum (Mo) which belong to transition metal.

Also, according to an embodiment of the present invention, the melting of the catalyst metal by heat treatment may be performed at a temperature lower than a melting point of the catalyst metal.

Also, according to an embodiment of the present invention, the melting of the catalyst metal by heat treatment may be performed in a vacuum atmosphere.

According to another aspect of the present invention, provided are carbon nanotubes from which a catalyst metal included in inner spaces of the carbon nanotubes is removed.

According to an embodiment of the present invention as described above, problems such as ignition or explosion caused by unexpected oxidation of the catalyst metal particles depending on the environment in use may be prevented by oxidizing the catalyst metal particles trapped inside the carbon nanotubes into a chemically stable metal oxide via oxidation heat treatment or by removing the catalyst metal particles by melting-acid pickling treatment.

However, the scope of the present invention is not limited by these effects.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
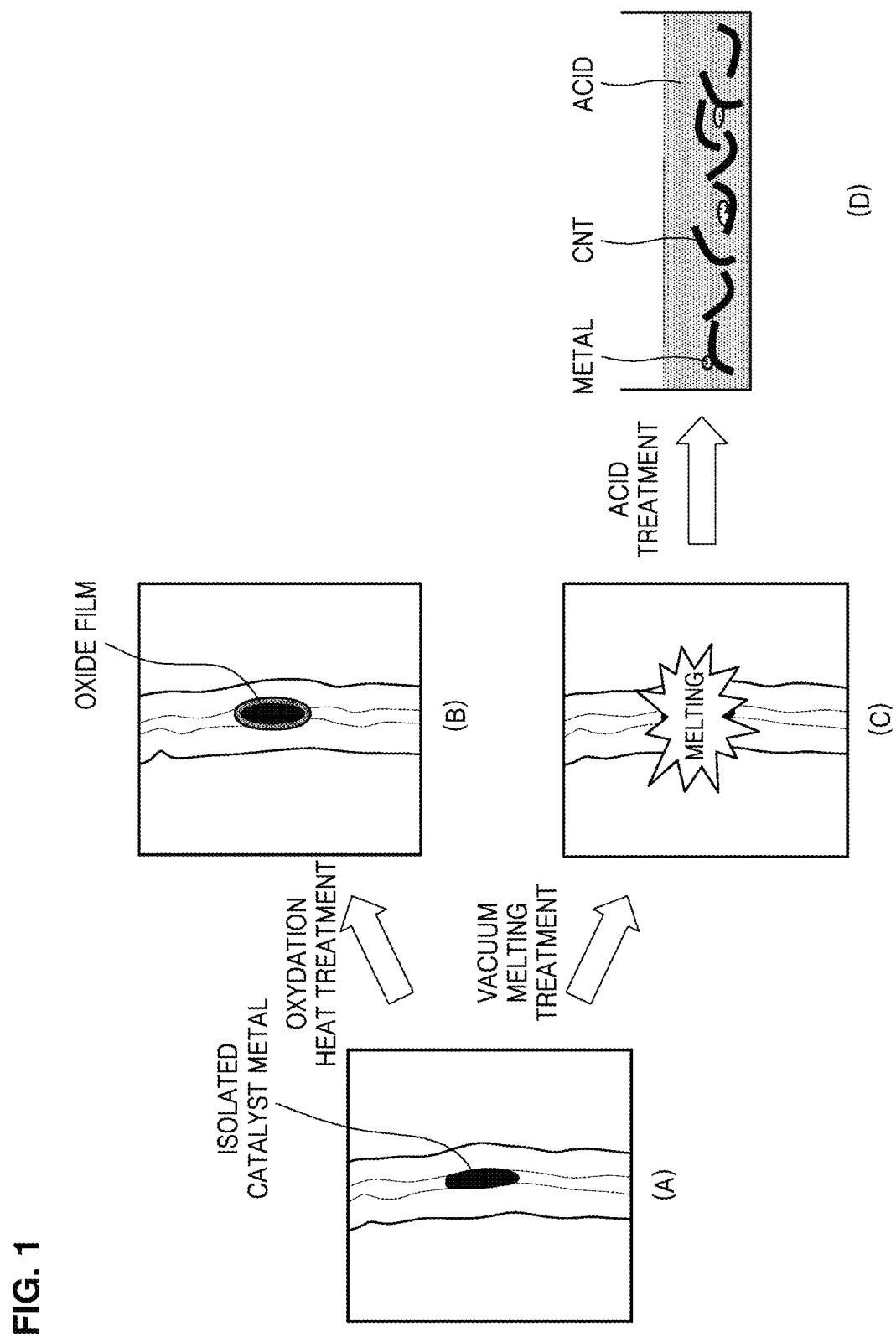
FIG. 1 is a schematic diagram illustrating oxidation heat treatment and melting-acid pickling treatment according to an embodiment of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein, in connection with one embodiment, may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views. In the drawings, the length, area, thicknesses, and shape of elements are exaggerated for clarity Hereinafter, embodiments of the present invention will be described in detail with reference to the accompanying drawings so that the present invention may be readily implemented by those skilled in the art.

FIG. 1 is a schematic diagram illustrating a method of stabilizing carbon nanotubes by oxidation heat treatment and by melting-acid pickling treatment according to an embodiment of the present invention.

(A) of FIG. 1 shows a carbon nanotube in which a catalyst metal is present. The carbon nanotube including the catalyst metal may be manufactured via gas phase synthesis by directly supplying a reaction gas and the catalyst metal to a reaction furnace and performing reaction in a gas phase.

The reaction gas is a hydrocarbon-based gas and may be selected from $C_2H_2$, $C_2H_4$, $CH_4$, $C_2H_6$, benzene, and xylene.

Also, the catalyst metal may be selected from iron, nickel, cobalt, aluminum, and molybdenum. The catalyst metal may be generated by vaporizing an organic catalyst metal, as a precursor, in a reaction furnace. For example, the organic catalyst metal contained in a container located in a heating furnace may be vaporized by heating so as to supply the vaporized organic catalyst metal to a reaction region in the reaction furnace together with the reaction gas. For example, when the catalyst metal is Fe, Ferrocene ($Fe(C_5H_2)_2$), Iron Phthalocyanine, and the like may be used as the organic catalyst metal.

Carbon nanotubes manufactured by the above-described gas phase synthesis may be single-wall carbon nanotubes or multi-wall carbon nanotubes in which the catalyst metal can be trapped inside the tubes due to their helical growth. More particularly, 5 wt % to 10 wt % of the catalyst metal may be trapped in carbon nanotubes while 90 wt % to 95 wt % of the catalyst metal may be located at outer portions of the carbon nanotubes. In addition, since the carbon nanotubes grow on the catalyst metal, the catalyst metal may also be located at end portions of the carbon nanotubes. Because the trapped carbon nanotubes are not exposed to acid during the conventional purification process, the catalyst metal may not be removed even after acid pickling treatment. Thus, about 10% of the catalyst metal may remain even after acid treatment for removing the catalyst metal of the carbon nanotubes.

(B) of FIG. 1 shows selective oxidation stabilization. The carbon nanotubes may be stabilized by surface oxidation of the catalyst metal via oxidation heat treatment of the carbon nanotubes including the catalyst metal.

The oxidation heat treatment includes a process of adding the produced carbon nanotubes to a furnace, heating the carbon nanotubes to an oxidation heat treatment temperature, and maintaining the temperature for a predetermined time.

In this regard, the oxidation heat treatment may be performed in an atmosphere of selectively oxidizing the catalyst metal included in the carbon nanotubes without oxidizing the carbon nanotubes. Such a selective oxidation may be selected from temperature and oxygen partial pressure conditions thermodynamically derived using Ellingham diagrams. Methods of deriving temperature and oxygen partial pressure enabling the selective oxidation using Ellingham diagrams are well known in the art, and thus detailed descriptions thereof will not be given herein.

Oxidation heat treatment may be performed under atmosphere or oxygen ambient conditions using a heating furnace commonly available in the art. Alternatively, as another example, oxygen heat treatment may be performed by evacuating a heating furnace that is available in a vacuum atmosphere and adjusting the oxygen partial pressure by controlling a flow of oxygen introduced thereinto. In this case, a vacuum pressure inside the heating furnace may be maintained in the range of $10^{-6}$ Torr to $10^{-3}$ Torr and the vacuum state is maintained until the heat treatment is completed. Vacuum oxidation heat treatment is more effective than conventional oxidation heat treatment since a permeation rate of oxygen into the carbon nanotubes in which the catalyst metal particles are trapped may be increased.

When temperature is rapidly raised to an oxidation heat treatment temperature during oxidation heat treatment, rapid reactions may occur between the catalyst metal and oxygen to cause explosive reactions, even ignition, so that the carbon nanotubes may be damaged. In order to prevent explosive reactions between the catalyst metal and oxygen, there is a need to appropriately control the heating rate.

(C) and (D) of FIG. 1 show a process of removing the catalyst metal by melting-acid pickling treatment. (C) of FIG. 1 shows a process of placing the carbon nanotubes including the catalyst metal in a vacuum furnace and melting the catalyst metal by raising temperature to a predetermined level in a vacuum atmosphere. In this regard, since a melting temperature of the catalyst metal needs to be equal to or higher than 1000° C. considering that the catalyst metal is iron, cobalt, molybdenum, or the like, this melting treatment should be performed in a vacuum atmosphere in order to prevent damage to (oxidation of) the carbon nanotubes. Meanwhile, nano-sized metal particles are chemically unstable due to large specific surface areas thereof and thus melted at a temperature lower than a melting point of a bulk state by 50% or less due to the chemical instability. For example, although a melting point of gold (Au) is 1064° C., particles having a size of 5 nm melt at about 900° C., and particles having a size of 2 nm or less melt at about 500° C. Thus, melting treatment of the nano-sized particles of the catalyst metal may be maintained at a lower temperature than the melting point of the bulk state. In the process of removing the catalyst metal in the melting-acid pickling treatment, only the residual catalyst metal included in the carbon nanotubes needs to be removed without causing damage such as oxidation to the carbon nanotubes. According to an embodiment of the present invention, the pressure may be $10^{-3}$ Torr or less and the melting temperature may be about 80% of the melting point of the catalyst metal although the melting temperature may vary according to type and size of the catalyst metal. According to an embodiment of the present invention, the melting treatment may be performed after raising temperature to a target temperature continuously or by steps. During heating, a heating rate may be in the range of 3° C./min to 10° C./min.

(D) of FIG. 1 illustrates that the catalyst metal is removed from the carbon nanotubes by eluting the catalyst metal out of the carbon nanotubes. The acid pickling treatment following the melting treatment may be performed in the same manner as those commonly used in the art for purification of carbon nanotubes ($HNO_3$, 80° C., for several tens of hours). By the acid pickling treatment following the melting treatment, the catalyst metal included in the inner spaces of the carbon nanotubes may be completely removed.

As described above, safe carbon nanotubes may be provided by chemically stabilizing the carbon nanotubes by oxidizing the catalyst metal included in the carbon nanotubes via heat treatment in an oxidizing atmosphere or by removing the catalyst metal by the melting-acid pickling treatment of the carbon nanotubes.

Figure 2:
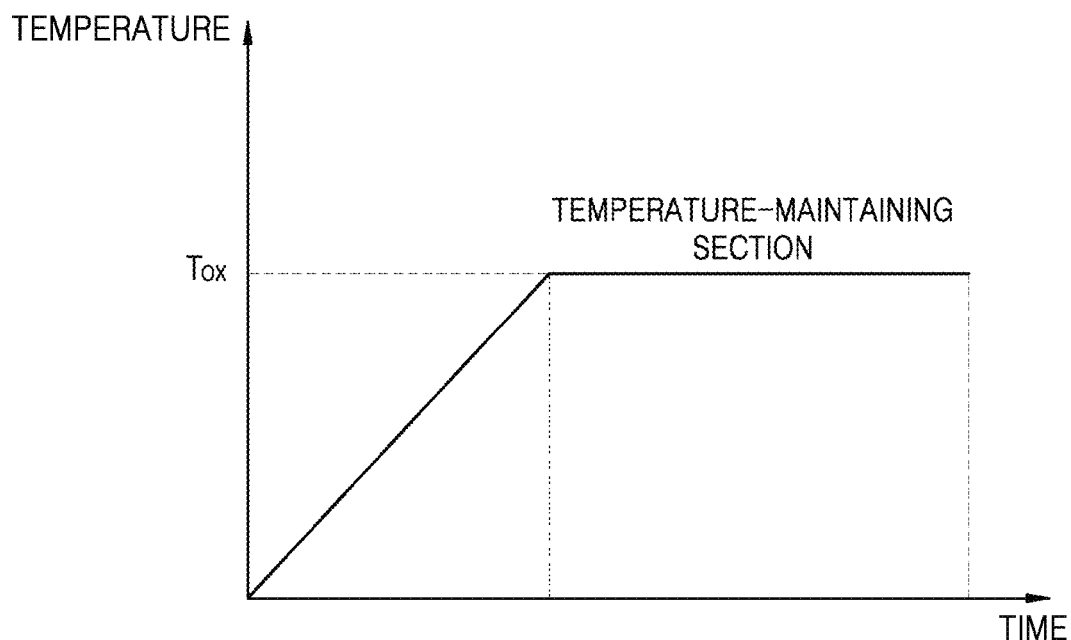
FIGS. 2 and 3 are graphs illustrating oxidation heat treatment methods according to an embodiment of the present invention.

FIG. 2 shows conditions for the oxidation heat treatment according to an embodiment. As shown in FIG. 2, the present embodiment may be performed by gradually and continuously raising the temperature to a target oxidation heat treatment temperature $T_{OX}$, and then maintaining the oxidation heat treatment temperature $T_{OX}$ for a predetermined time.

In FIG. 2, the temperature maintaining section is a section in which oxidation heat treatment is performed on the catalyst metal, and the temperature may be maintained in a range for selectively oxidizing the catalyst metal. For example, the temperature may be in the range of 100° C. to 500° C., preferably, 200° C. to 500° C. The temperature may be maintained, for example, for 20 minutes to 120 minutes.

The heating rate is controlled to prevent rapid oxidation of the catalyst metal, for example, the heating rate may be in the range of 3° C./min to 10° C./min.

As another example, the oxidation heat treatment may be performed by a method including once or more steps of maintaining a constant temperature during the process of raising temperature to the final oxidation heat treatment temperature. FIG. 2 shows an example to which a stepwise process of raising temperature is applied.

Figure 3:
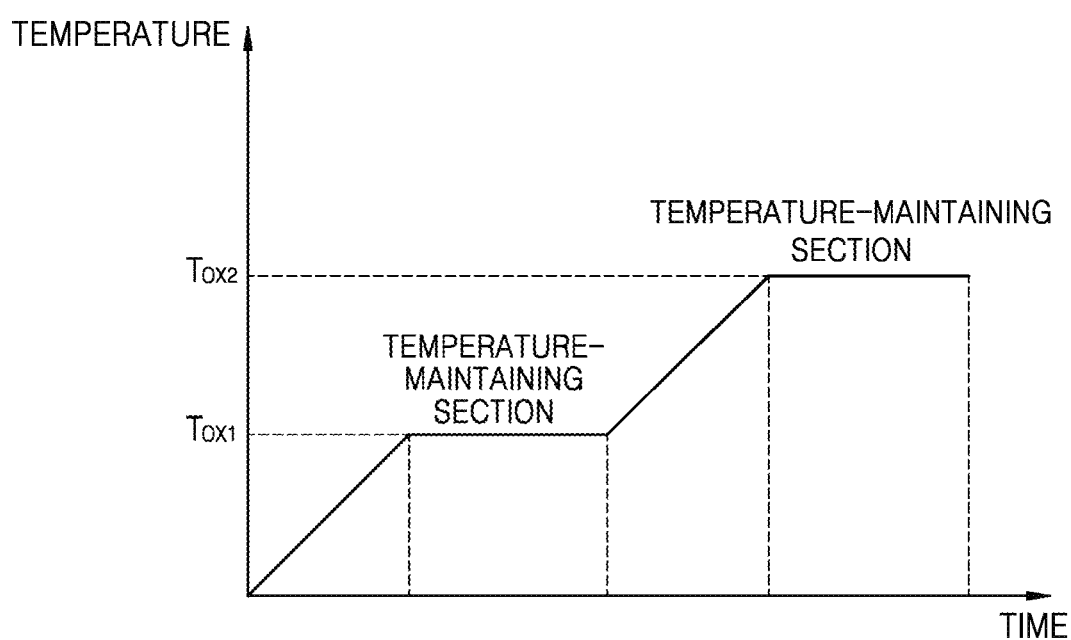
Figure 4:
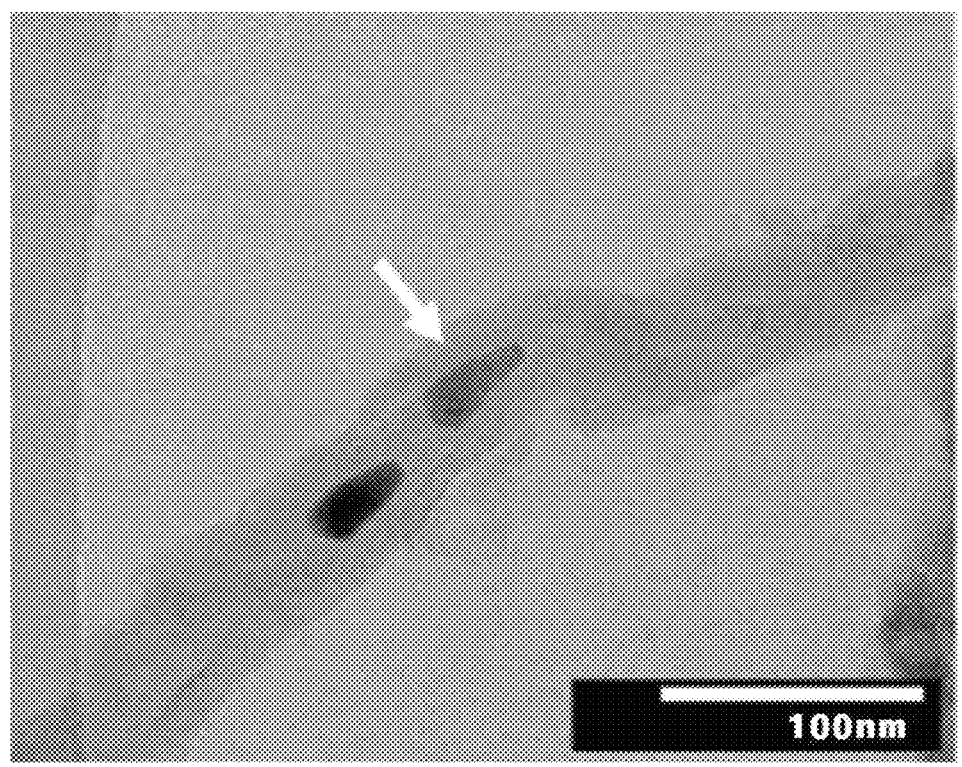
FIG. 4 is a transmission electron microscope (TEM) image of carbon nanotubes including a catalyst metal.

Referring to FIG. 3, oxidation heat treatment may be performed by two-step process.

For example, the first heat treatment process may be performed by maintaining the temperature at a first heat treatment temperature $T_{OX1}$ for 30 minutes to 120 minutes after raising the temperature to the first heat treatment temperature $T_{OX1}$. In this case, the first heat treatment temperature $T_{OX1}$ may be in the range of 25° C. to 300° C. In addition, a heating rate to the first heat treatment temperature $T_{OX1}$ may be in the range of 3° C./min to 10° C./min.

Upon completion of the first heat treatment process, the temperature is raised to a second heat treatment temperature $T_{OX}$. In this regard, the heating rate may be in the range of 3° C./min to 10° C./min.

The second heat treatment temperature $T_{OX}$ may be in the range of 300° C. to 500° C., and the second heat treatment temperature $T_{OX}$ may be maintained, for example, for 20 minutes to 120 minutes.

As described above, since the first heat treatment temperature $T_{OX1}$, which is lower than the second heat treatment temperature, is maintained for a predetermined time before reaching the second heat treatment temperature $T_{OX2}$, which is the final oxidation heat treatment temperature the reaction between the catalyst metal and oxygen to occur by a certain degree at the lower temperature and then the temperature is raised to the final oxidation heat treatment temperature so that rapid reaction between the catalyst metal and oxygen may be prevented.

Although FIG. 3 shows only one step of maintaining a predetermined temperature before reaching the final oxidation heat treatment temperature during the temperature-raising process, the present invention is not limited thereto, and two or more steps of maintaining a relatively low temperature may be performed before reaching the final oxidation heat treatment temperature to control the heating rate.

Selectively, purification for removing the catalyst metal on the outside or end portions of the carbon nanotubes may previously be performed by acid pickling before the oxidation heat treatment of the carbon nanotubes. Any acid capable of dissolving the catalyst metal and commonly used in acid pickling treatment may be used without limitation.

By chemically dissolving and removing the catalyst metal other than that trapped inside the carbon nanotubes via acid pickling treatment, impurities finally included in the carbon nanotubes may be reduced to a metal oxide included in the carbon nanotubes. In addition, the possibility of ignition or explosion caused by rapid reactions between the catalyst and oxygen may be considerably reduced in the oxidation heat treatment in the oxidation heat treatment. However, since the activity of the catalyst metal may be reduced or eliminated by oxidation treatment without performing the acid pickling treatment, the present invention is not limited thereto.

The carbon nanotubes stabilized according to the oxidation treatment of the present invention include particles of an oxide of the catalyst metal. The oxide is chemically stable thus loses activity in practical use like LIBs, preventing the fatigue explosion.

Hereinafter, the present invention will be described in more detail according to the following examples. However, the following examples are merely presented to exemplify the present invention and the present invention is not limited thereto.

EXAMPLES

Example 1

Commercially available carbon nanotubes purified by acid treatment were placed in a vacuum chamber and a vacuum pressure thereof was maintained at $10^{-3}$ Torr. Then, first heat treatment was performed by raising temperature to 300° C. at a heating rate of 10° C./min and maintaining the temperature for 30 minutes. While maintaining the temperature, oxygen gas was injected at a flow rate of 200 sccm. Then, second heat treatment was performed by raising the temperature to 500° C. with a heating rate of 10° C./min and maintaining the temperature for 1 hour, thereby completing oxidation heat treatment.

Via oxidation heat treatment performed as described in Example 1, only the catalyst metal was oxidized without oxidizing the carbon nanotubes, and thus stabilized carbon nanotubes were prepared. A conductivity of the carbon nanotubes stabilized by oxidation was the same as that of carbon nanotubes before the heat treatment, and thus it was confirmed that the carbon nanotubes were not oxidized during the oxidation heat treatment.

Example 2

Commercially available carbon nanotubes were subjected to oxidation heat treatment in the same manner as in Example 1, except that the purification treatment was not performed. Similar to the carbon nanotubes of Example 1 having undergone oxidation heat treatment, stabilized carbon nanotubes in which only the catalyst metal included in the carbon nanotubes was oxidized without oxidizing the carbon nanotubes were prepared. When the carbon nanotubes stabilized by oxidation heat treatment are used as a conductive agent of lithium ion batteries, stable performance may be obtained without additional oxidation reactions.

Example 3

Commercially available carbon nanotubes purified by acid treatment were placed in a furnace under atmospheric conditions, and oxidation heat treatment was performed in the same manner as in Example 1. Similar to the results of Examples 1 and 2, stable carbon nanotubes in which only the catalyst metal included in the carbon nanotubes was oxidized without oxidizing the carbon nanotubes were prepared. When the carbon nanotubes stabilized by oxidation heat treatment are used as a conductive agent of lithium ion batteries, stable performance may be obtained without additional oxidation reactions.

Example 4

Commercially available unpurified carbon nanotubes were placed in a furnace under atmospheric conditions, and oxidation heat treatment was performed in the same manner as in Example 1. When the carbon nanotubes stabilized by oxidation heat treatment are used as a conductive agent of lithium ion batteries, stable performance may be obtained without additional oxidation reactions.

Example 5

Commercially available carbon nanotubes synthesized using iron (Fe) as a catalyst metal and purified by acid treatment were placed in a vacuum container, and a vacuum pressure thereof was maintained at $10^{-3}$ Torr. Then, first heat treatment was performed by raising temperature to 1000° C. at a heating rate of 50° C./min and maintaining the temperature for 30 minutes. Then, for melting treatment, the temperature was raised to 1200° C. at a heating rate of 10° C./min and maintained at 1200° C. for 1 hour, thereby completing vacuum melting treatment. As a result of analyzing a sample having undergone the vacuum melting treatment using an electron microscope, it was confirmed that the catalyst metal was melted and eluted out of the carbon nanotubes. The sample having undergone the vacuum melting treatment was maintained under normal acid picking treatment conditions ($HNO_3$, 80° C.) for 1 hour to remove the catalyst metal melted and eluted out of the carbon nanotubes. When the carbon nanotubes stabilized by removing the catalyst metal therefrom by melting treatment are used as a conductive agent of lithium ion batteries, stable performance may be obtained without additional oxidation reactions.

Example 6

Commercially available carbon nanotubes synthesized using molybdenum (Mo) as a catalyst metal and purified by acid treatment were subjected to vacuum melting treatment in the same manner as in Example 5, except that the carbon nanotubes were maintained at a melting temperature of 1400° C. for 1 hour. As a result of analyzing the sample having undergone the vacuum melting treatment using an electron microscope, it was confirmed that the catalyst metal was melted and eluted out of the carbon nanotubes. A sample having undergone the vacuum melting treatment was maintained under normal acid picking treatment conditions ($HNO_3$, 80° C.) for 1 hour to remove the catalyst metal melted and eluted out of the carbon nanotubes. When the carbon nanotubes stabilized by removing the catalyst metal therefrom by melting treatment are used as a conductive agent of lithium ion batteries, stable performance may be obtained without additional oxidation reactions.

While one or more embodiments of the present invention have been described with reference to the drawings, it will be understood by those of ordinary skill in the art that various changes in form and details may be made therein without departing from the spirit and scope of the present invention as defined by the following claims.

What is claimed is:

1. A method of safely stabilizing carbon nanotubes that contain unstable catalyst metal therein, the method comprising, in the order recited:
   preparing carbon nanotubes which are unpurified containing a residual catalyst metal at an outside, an end, or an inside of the carbon nanotubes that is unstable, wherein the residual catalyst metal at the end of the carbon nanotubes is exposed to an outside thereof while the residual catalyst metal at the inside of the nanotubes is unexposed to the outside thereof;
   acid pickling the carbon nanotubes to remove the exposed residual catalyst metal from the outside and the end of the inside of the carbon nanotubes; and
   oxidizing the unexposed residual catalyst metal by heat-treating the carbon nanotubes,
   wherein the heat-treating is performed in an oxygen-containing atmosphere that selectively oxidizes the residual catalyst metal contained within the carbon nanotubes without oxidizing the carbon nanotubes,
   wherein the acid pickling to remove the residual catalyst metal from the outside, the end, or the inside of the carbon nanotubes reduces danger of explosions during the subsequent heat-treating to oxidize the residual catalyst metal contained within the carbon nanotubes.

2. The method of claim 1, wherein the heat-treating is performed in a temperature range of 100° C. to 500° C.

3. The method of claim 1, wherein the heat-treating is performed in a vacuum chamber under an oxygen-containing atmosphere that is either ambient air or oxygen.

4. The method of claim 1, wherein the heat-treating is performed after continuously raising temperature to an oxidation heat treatment temperature.

5. The method of claim 1, wherein the heat-treating comprises one or more steps of maintaining a constant temperature during a process of raising the temperature to a final oxidation heat treatment temperature.

6. The method of claim 4, wherein a heating rate is in a range of 3° C./min to 10° C./min while raising the temperature.

7. The method of claim 5, wherein the heat-treating comprises:
   a first heat treatment process for oxidation heat treatment performed in a temperature range of 25° C. to 300° C.;
   a temperature-raising process after the first heat treatment process; and
   a second heat treatment process for oxidation heat treatment performed in a temperature range of 300° C. to 500° C.

8. The method of claim 1, wherein the catalyst metal is selected from the group consisting of iron (Fe), nickel (Ni), cobalt (Co), and aluminum (Al).

9. A method of safely stabilizing carbon nanotubes that contain unstable catalyst metal therein, the method comprising, in the order recited:
   preparing carbon nanotubes which are unpurified containing a residual catalyst metal at an outside, an end, or an inside of the carbon nanotubes that is unstable, wherein the residual catalyst metal at the end of the carbon nanotubes is exposed to outside thereof while the residual catalyst metal at the inside of the nanotubes is unexposed to the outside thereof;
   first acid pickling the carbon nanotubes to remove the exposed residual catalyst metal existing at the outside and the end of carbon nanotubes;
   melting the unexposed residual catalyst metal by heat-treating the carbon nanotubes, wherein the melting occurs explosively breaking the carbon nanotubes exposing the residual catalyst metal to the outside; and
   second acid pickling the carbon nanotubes to remove the melted and solidified residual catalyst metal which is exposed to the outside during the heat-treating the carbon nanotubes.

10. The method of claim 9, wherein the second acid pickling is accomplished by removing the melted and solidified residual catalyst metal from the carbon nanotubes.

11. The method of claim 9, wherein the residual catalyst metal is selected from the group consisting of iron (Fe), nickel (Ni), cobalt (Co), aluminum (Al), and molybdenum (Mo).

12. The method of claim 9, wherein the heat-treating is performed at a temperature lower than a melting point of the catalyst metal.

13. The method of claim 9, wherein the heat-treating is conducted in a vacuum atmosphere.

14. The method of claim 9, wherein the residual catalyst metal is removed from inner spaces of the carbon nanotubes.

15. The method of claim 5, wherein raising the temperature during heat-treating proceeds at a heating rate ranging from 3° C./min to 10° C./min.

* * * * *